Oct. 7, 1952      R. J. MOLUDY      2,613,083
DOLLY FOR TRANSPORTING TRIPOD CAMERAS

Filed Dec. 29, 1947      3 Sheets-Sheet 1

Inventor

Rudolph Joseph Moludy

By Clarence A. O'Brien
and Harvey B. Jacobson
Attorneys

Oct. 7, 1952 — R. J. MOLUDY — 2,613,083
DOLLY FOR TRANSPORTING TRIPOD CAMERAS
Filed Dec. 29, 1947 — 3 Sheets-Sheet 2
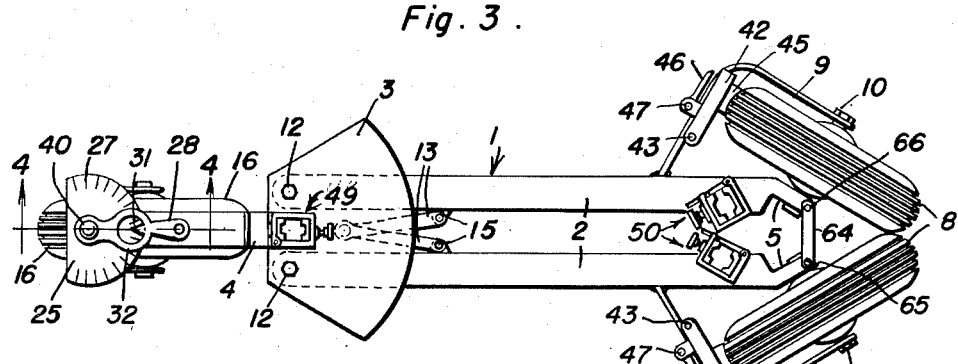
Fig. 3.
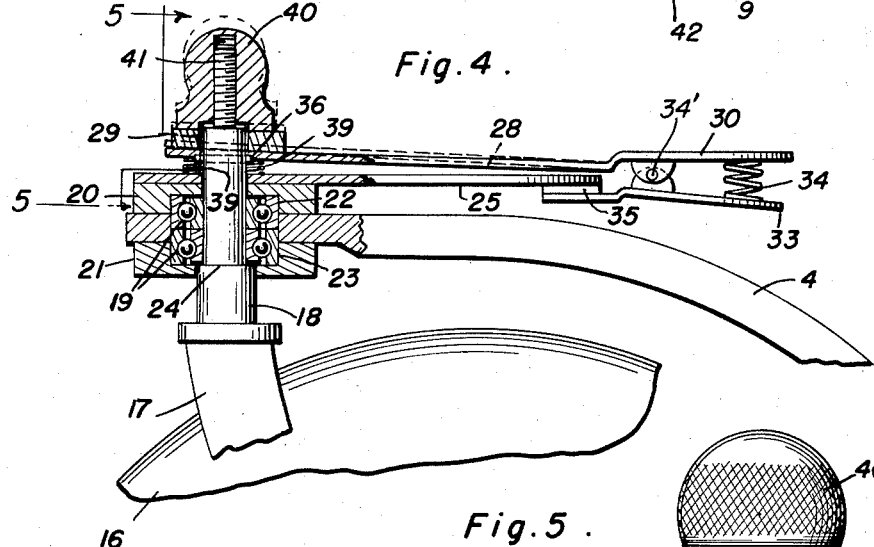
Fig. 4.
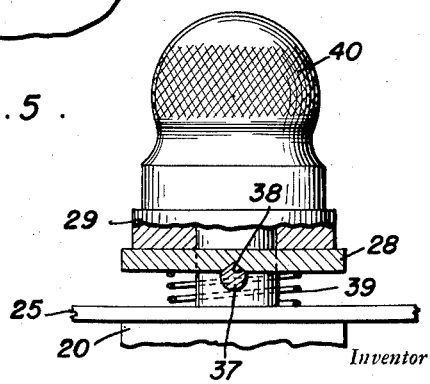
Fig. 5.
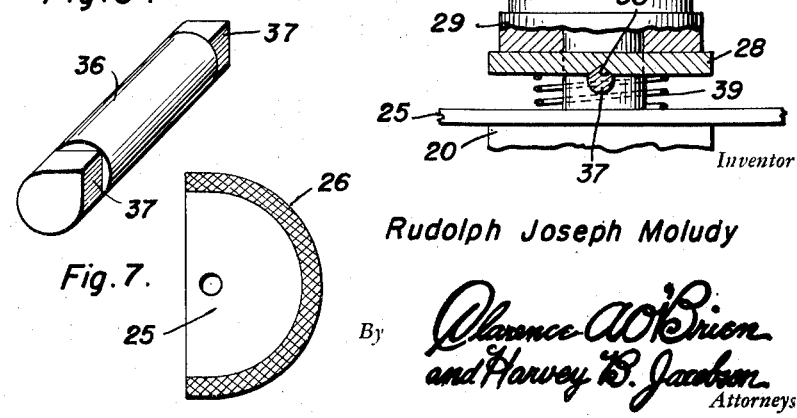
Fig. 6.
Fig. 7.
Inventor
Rudolph Joseph Moludy
By Clarence A. O'Brien
and Harvey B. Jacobson
Attorneys

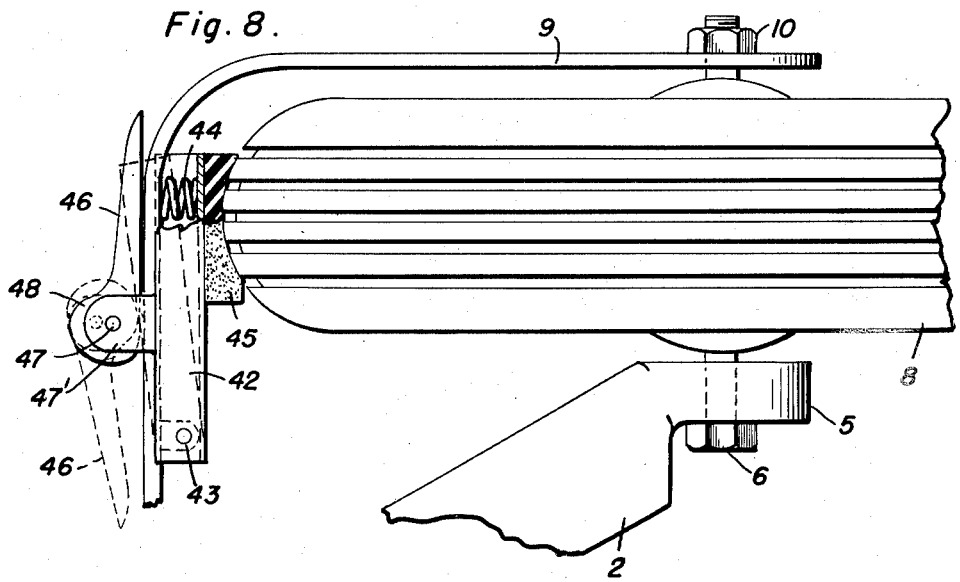
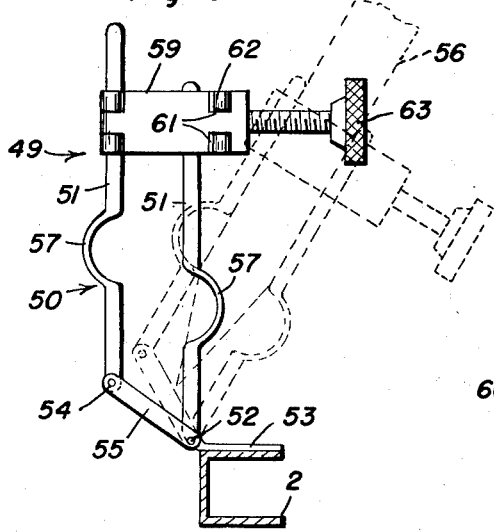
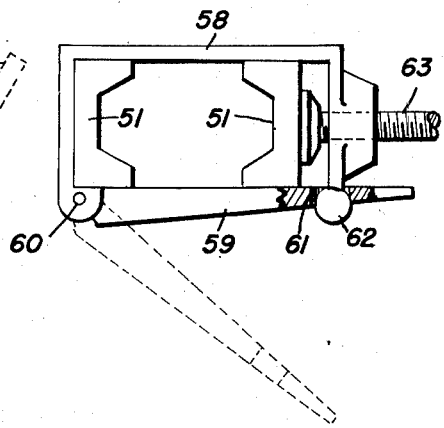
Inventor
Rudolph Joseph Moludy

Patented Oct. 7, 1952

2,613,083

UNITED STATES PATENT OFFICE 2,613,083

DOLLY FOR TRANSPORTING TRIPOD CAMERAS

Rudolph Joseph Moludy, Akron, Ohio

Application December 29, 1947, Serial No. 794,301

1 Claim. (Cl. 280—42)

My invention relates to improvements in dollies for transporting tripod cameras in taking moving pictures in a studio, or other field of operation.

The primary object of my invention is to provide a simply constructed, lightweight, strong dolly for carrying a tripod moving picture camera, when set up, in a manner to reduce vibration of the camera to a minimum, and which is especially adapted for easy quick maneuvering into different positions, for instance, in following up in the taking of moving pictures, and in taking pictures from different angles, and which is particularly designed for quick folding, when not in use, into a compact easily carried bundle.

Another object is to equip such dollies with means for fastening the tripod legs of a moving picture camera thereon in a manner to minimize vibration of the camera during transporting, and rendering fastening as well as unfastening of the legs of the camera quick and easy.

Other and subordinate objects, within the purview of my invention, together with the precise nature of my improvements, and the advantages thereof, will be readily understood when the succeeding description and claim are read with reference to the drawings accompanying and forming part of this specification.

In said drawings:

Figure 3 is a view in plan showing the dolly folded;

Figure 4 is a detailed view in vertical longitudinal section taken on the line 4—4 of Figure 3 and drawn to a larger scale;

Figure 5 is a detailed view in vertical section taken on the line 5—5 of Figure 4 and drawn to a larger scale;

Figure 6 is a view in perspective of the clutch pin;

Figure 7 is a view in bottom plan view of the sector plate;

Figure 8 is a fragmentary view in plan, partly broken away and shown in section, illustrating in detail one of the rear wheel brakes, the parts being drawn to a larger scale;

Figure 9 is a view in side elevation, partly in section, of one of the clamps with the same illustrated in broken lines in clamping relation to one leg of a tripod mounting of a moving picture camera;

Figure 10 is a view in plan, partly broken away and shown in section, of the clamp drawn to a larger scale and illustrating in broken lines the manner in which the yoke is opened.

Figure 1:
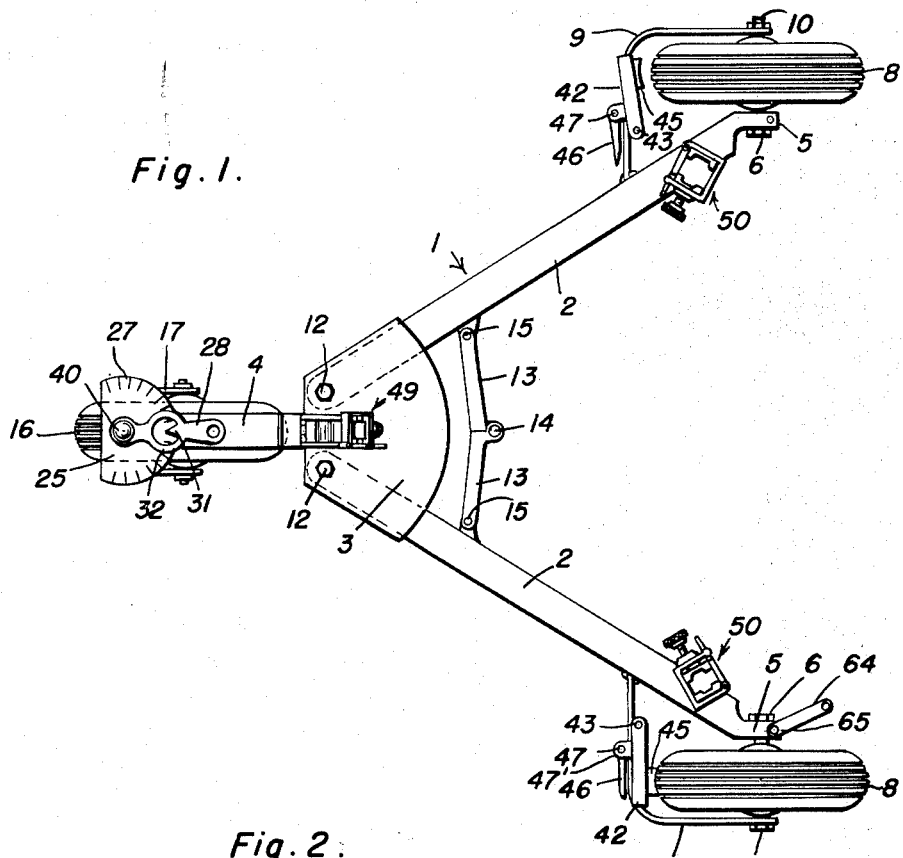
Figure 1 is a view in plan of my improved dolly in a preferred embodiment thereof, the dolly being unfolded.
Figure 2:
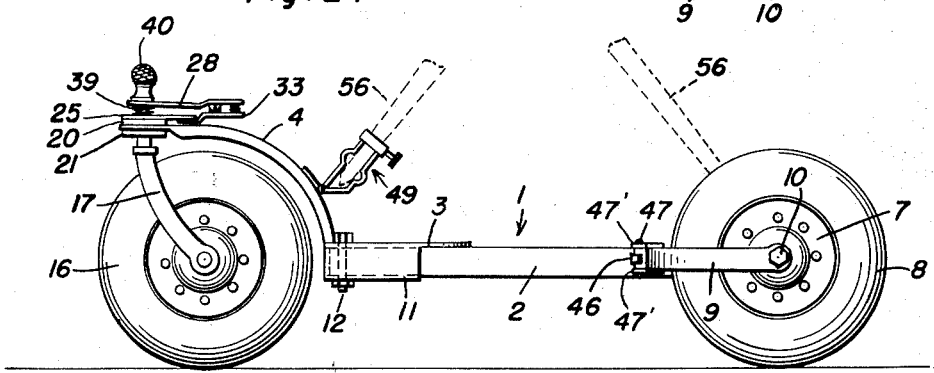
Figure 2 is a view in side elevation.

Referring to the drawings by numerals, according to my invention, as illustrated, a dolly of the tricycle type is provided comprising a frame, designated as a unit by the numeral 1, and embodying a pair of side bars 2, a front, connecting saddle plate 3 for said side bars 2, and a forwardly and upwardly arched fork carrying bar 4.

The side bars 2 are of square metal tubing with laterally inclined rear ends 5 in which are threaded nut equipped wheel spindles 6 extending outwardly from said ends 5 and having rotatably mounted thereon a pair of rear disk wheels 7 with pneumatic tires 8 thereon.

Right angled fender bars 9 extend horizontally outwardly from the side bars 2 across the front of the rear wheels 7 in the horizontal center of said wheels with rear ends extending alongside said wheels on the outboard sides thereof, said rear ends being secured on the wheel spindles 6 by nuts 10.

The saddle plate 3 overlies the front ends of the side bars 2 with rearwardly diverging, depending side flanges 11, and the front ends of said bars 2 are pivoted to said plate, as at 12, upon opposite sides of the longitudinal center of the plate, for swinging of said bars into relatively divergent relation against the flanges 11 which thereby act as stops for said side bars 2 in the unfolded position of the dolly.

A pair of links 13 connected together by an elbow joint 14 extend between said side bars 2 immediately in the rear of said plate 3 with ends pivoted, as at 15, to said bars 2 so that said links may break joint forwardly but be straightened out to lock said side bars 2 against the flanges 11 and in rearwardly diverging unfolded relation.

A caster-type front, steering wheel 16, like the rear wheels 7 otherwise, has its fork 17 provided with an upstanding spindle 18 journalled in ball bearings, as at 19, set into the front end of the fork carrying bar 4 and retained in said bar by a pair of upper and lower collars 20, 21 suitably secured to the top and bottom of said bar 4 and recessed, as at 22, 23 to seat said bearings 19 therein. A shoulder 24 on the spindle 18 prevents upward end play of said spindle in said bearings 19.

A sector plate 25 extends horizontally rearwardly from the upper collar 20 and is suitably fixed on top thereof with the spindle 18 extending therethrough, said sector plate having its curved edge roughened on the bottom, as at 26, and graduated on top, as at 27, all for a purpose presently seen.

The steering wheel 16 is adapted to be turned at will, and/or set into different angular positions by means now to be described.

A steering arm 28 is rotatably and slidably mounted, at its front end, on the spindle 18 to extend rearwardly above the sector plate 25 and be swung sidewise, with a collar 29 thereon loosely engaging said spindle 18, said arm having a rear hand-grip 30. A pointer finger 31 visible through an opening 32 in said arm 28 is adapted to register with a selected graduation 27 on the sector plate 25. A detent bar 33 is pivoted, as at 34', to the hand-grip 30 in underlying relation thereto and tensioned by a suitable coil spring 34 to frictionally grip the roughened edge 26 of the sector plate 25 and thereby frictionally lock the steering 28 to said sector plate. Friction gripping material 35 may be provided on the detent bar 33 for engaging the roughened edge 26 of said sector plate 25. By squeezing the detent bar 33 toward the hand-grip 30, the steering arm 28 may be released from the sector plate 25 for swinging at will, as will be clear.

Clutch means are provided between the steering arm 28 and the spindle 18 and now to be described. A clutch pin 36, best shown in Figure 6, with upturned knife edge, ends 37 extends through and is fixed diametrically in the spindle 18 directly below the front end of the steering arm 28 with said ends 37 thereof adapted to seat upwardly in V-shaped clutch grooves 38 formed in the bottom of the steering arm 28 to form with said pin an engaged clutch between the spindle 18 and the steering arm 28. A coil spring 39 surrounding the spindle 18 between the steering arm 28 and the sector plate 25 urges said arm upwardly, at its front end, to unseat the clutch pin 36 and disengage the clutch. A knurled hand-grip knob 40 is threaded onto a reduced upper end 41 of the spindle 18 to be screwed down thereon against the collar 29 and move the front end of the steering arm 28 downwardly, in opposition to the coil spring 29, to thereby seat the clutch pin 36 in the clutch grooves 38 and engage the described clutch.

A pair of rear wheel brakes are provided for the dolly. Each brake comprises a channel brake bar 42 extending across the front of the rear wheel tire 8 with an inner end pivoted, as at 43, on the fender bar 9 for said wheel so that said bar may be swung horizontally toward and from the tire 8 into and from brake applying position, and straddle said bar 9 when swung from brake applying position. A coil spring 44 interposed between the brake bar 42 and the fender bar 9 urges the brake bar 42 into brake applying position. A suitable rubber composition brake shoe 45 on the brake bar 42 is provided for engaging the tire 8 of the wheel 7. A cam end brake release lever 46 is pivoted eccentrically on a vertical pin 47 between laterally extending ears 47' on the brake bar 42, said ears straddling the fender bar 9, and said brake release lever 46 being arranged to be swung from a brake releasing position alongside the fender bar 9 into a brake applying position in which the cam end 48 thereof coacts with the fender bar 9 to cam the brake bar 42 into brake releasing position in opposition to the coil spring 44, as shown by broken lines in Figure 8.

A front clamp 49 is provided on the fork carrying bar 4, and a pair of rear clamps 50 on the rear ends of the side bars 2 for clampingly engaging the legs of a tripod mounting, not shown, of a moving picture camera. Each clamp 49, 50, for example one of the clamps 50 illustrated in detail in Figures 9, 10, comprises a pair of opposite, substantially parallel and resilient channel bars 51 with channel sides facing and one of which has a lower end pivoted, as at 52, on a plate 53 adapted to be suitably fixed to the fork carrying bar 4, or the side bar 2, as the case may be, so that said bar 51 may be swung upwardly into upright position. The other clamping bar 51 is pivoted at its lower end, as at 54, to a link 55 swingable on the pivot 52 so that said bars 51 may be clampingly engaged with opposite sides of a tripod mounting leg 56, as shown by dotted lines in Figure 9. Outwardly bowed, intermediate portions 57 of said bars 51 provide for the same conforming to the shape of the leg 56. A rectangular yoke 58 is provided for coupling the upper ends of the clamping bars 51 together and which is provided with a side arm 59 pivoted, as at 60, for swinging outwardly to open the yokes so that the leg 56 may be inserted sidewise in-between the clamping bars 51. The arm 59 is notched as at 61, to snap into a fork 62 on said yoke 58 to thereby close said yoke. A hand screw 63 is threaded through one end of the yoke 58 to be turned against one bar 51 to cause said bars 51 to move into clamping relation. As will be seen, each clamp 49, 50, as the case may be, is swingable on the pivot 52 so that said clamps may be arranged in upwardly converging relation to accommodate the usual legs of a tripod mounting for a moving picture camera of commerce.

As will now be seen, with the hand-grip knob 40 threaded down on the portion 41 of the spindle 18, the clutch pin 36 will be seated in the clutch grooves 38 so that the steering arm 28 will be clutched to said spindle. Now, by grasping the hand-grip 30 and squeezing on the detent bar 33, said arm 28 may be swung to steer the dolly freely, or to set the steering wheel 16 at a desired angle, as selected by registration of the pointer finger 31 with a selected graduation 27 on the sector plate 25, in which setting said wheel may be retained by releasing the detent bar 33 for friction locking with the sector plate 25 in the manner already described. On the other hand, by loosening the hand-grip knob 40, the clutch pin 36 may be unseated, in the manner already described, so that the spindle 18 is freed and the dolly may be pushed along, or around, with the caster wheel 16 turning freely for steering of the dolly according to manipulation of the same by the operator. In this connection, brake releasing levers 46 may be operated to engage the brake for either rear wheel 7 so that the dolly will turn in a circle around the braked rear wheel, and the rear wheel brakes may be both applied when it is desired to hold the dolly stationary.

To fold the dolly, when it is not in use, the links 13 are pushed forwardly to break the joint 14, which causes the side bars 2 to be swung toward each other into parallel relation, in which position of said side bars the rear wheels 7 converge rearwardly and abut as shown in Figure 3. A link 64 is pivoted on a pin 65 on the rear end 5 of one side bar 2 for connection to a similar pin 66 on the rear end 5 of the other side bar 2 to hold said dolly folded.

The tires 8 for the wheels 7 and that for the front wheel 16 are preferably oversize balloon tires which may be under-inflated to keep the same soft so as to minimize vibration according to weight of equipment being carried.

The clamps 49, 50 will accommodate therein tripod legs of different shapes and materials without damaging the same, for instance, aluminum legs which are easily dented and scratched and are self-aligning relative to legs inserted therein.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claim.

Having described the invention what is claimed as new is:

In a folding dolly for transporting a tripod camera, a pair of side bars having front and rear ends, a plate to which the front ends of said side bars are pivoted for swinging of said bars into and from divergent relation to unfold and fold the dolly respectively, side flanges on said plate for limiting swinging of said side bars into divergent relation, a rear wheel on the rear end of each side bar, an upwardly arched bar fixed to and extending forwardly of said plate, a front steering wheel mounted in said arched bar, holding means extending between and connected to said side bars for retaining the same in divergent relation against said flanges, and means on said arched bar and said side bars for fastening the legs of a tripod thereto.

RUDOLPH JOSEPH MOLUDY.

REFERENCES CITED

The following references are of record in the file of this patent:

UNITED STATES PATENTS

| Number | Name | Date |
| --- | --- | --- |
| 649,300 | Hall et al. | May 8, 1900 |
| 924,708 | West | June 15, 1909 |
| 1,064,538 | Quickel | June 10, 1913 |
| 1,085,573 | Adams | Jan. 27, 1914 |
| 1,559,796 | Shuey et al. | Nov. 3, 1925 |
| 1,570,787 | Schroeder | Jan. 26, 1926 |
| 1,601,917 | Kinvall | Oct. 5, 1926 |
| 1,637,129 | Pritchett | July 26, 1927 |
| 1,956,261 | Wagner | Apr. 24, 1934 |
| 1,987,842 | Sampson | Jan. 15, 1935 |
| 2,028,445 | Gelbman | Jan. 21, 1936 |
| 2,219,969 | Vaughan | Oct. 29, 1940 |
| 2,235,045 | Ronning | Mar. 18, 1941 |
| 2,269,910 | Naab | Jan. 13, 1942 |
| 2,284,801 | Conger | June 2, 1942 |
| 2,388,692 | House | Nov. 13, 1945 |